(12) United States Patent　　　(10) Patent No.: US 12,604,000 B2
Gao et al.　　　　　　　　　　　　(45) Date of Patent: Apr. 14, 2026

(54) SYSTEMS AND METHODS FOR PARTITION-BASED PREDICTION MODE REORDERING

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Jing Ye, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 120 days.

(21) Appl. No.: 18/244,837

(22) Filed: Sep. 11, 2023

(65)　　　　　Prior Publication Data

US 2024/0275965 A1　　　Aug. 15, 2024

Related U.S. Application Data

(60) Provisional application No. 63/443,360, filed on Feb. 3, 2023.

(51) Int. Cl.
　　H04N 19/119　　　(2014.01)
　　H04N 19/105　　　(2014.01)
　　　　　　　(Continued)
(52) U.S. Cl.
　　CPC ......... H04N 19/119 (2014.11); H04N 19/105 (2014.11); H04N 19/132 (2014.11); H04N 19/176 (2014.11)

(58) Field of Classification Search
None
See application file for complete search history.

(56)　　　　　References Cited

U.S. PATENT DOCUMENTS

| | | | |
|---|---|---|---|
| 11,558,611 | B2 | 1/2023 | Bordes |
| 11,949,888 | B2 | 4/2024 | Liao |

(Continued)

FOREIGN PATENT DOCUMENTS

| | | |
|---|---|---|
| WO | WO 2013048033 A1 | 4/2013 |
| WO | WO 2020054060 A1 | 3/2020 |

OTHER PUBLICATIONS

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, 541 pgs.

(Continued)

*Primary Examiner* — Lindsay J Uhl
(74) *Attorney, Agent, or Firm* — Morgan, Lewis & Bockius LLP

(57)　　　　　ABSTRACT

The various implementations described herein include methods and systems for encoding and decoding video. In one aspect, a method of video decoding includes receiving video data that includes a first block from a video bitstream. The method also includes obtaining a set of partition modes and generating a reference template for the first block. The method further includes identifying, from the video bitstream, an index for the reordered set of partition modes, and reconstructing the first block using a first partition mode of the reordered set of partition modes, where the first partition mode corresponds to the index.

20 Claims, 10 Drawing Sheets

(51) Int. Cl.
 *H04N 19/132* (2014.01)
 *H04N 19/176* (2014.01)

(56) References Cited

U.S. PATENT DOCUMENTS

| | | | |
|---|---|---|---|
| 2007/0009044 A1 | 1/2007 | Tourapis et al. | |
| 2013/0070854 A1 | 3/2013 | Wang et al. | |
| 2013/0169613 A1 | 7/2013 | Chen et al. | |
| 2017/0332084 A1 | 11/2017 | Seregin et al. | |
| 2018/0070100 A1 | 3/2018 | Chen et al. | |
| 2020/0036966 A1 | 1/2020 | Na et al. | |
| 2020/0036992 A1 | 1/2020 | Lim et al. | |
| 2020/0162728 A1 | 5/2020 | Van Der Auwera et al. | |
| 2020/0275112 A1 | 8/2020 | Chiang et al. | |
| 2021/0067776 A1 | 3/2021 | Reuze et al. | |
| 2021/0112253 A1 | 4/2021 | Xu et al. | |
| 2021/0160520 A1 | 5/2021 | Chen et al. | |
| 2021/0185329 A1 | 6/2021 | Merkle et al. | |
| 2021/0243452 A1 | 8/2021 | Zhao et al. | |
| 2021/0258574 A1 | 8/2021 | Gao et al. | |
| 2021/0368193 A1 | 11/2021 | Chen et al. | |
| 2022/0116586 A1 | 4/2022 | Esenlik et al. | |
| 2022/0224897 A1 | 7/2022 | Zhang et al. | |
| 2022/0256144 A1* | 8/2022 | Lim | H04N 19/105 |
| 2022/0337844 A1* | 10/2022 | Deng | H04N 19/157 |
| 2023/0034458 A1 | 2/2023 | Chen et al. | |
| 2023/0231992 A1* | 7/2023 | Chen | H04N 19/132 |
| | | | 375/240.02 |
| 2023/0412801 A1 | 12/2023 | Yang et al. | |
| 2024/0015333 A1* | 1/2024 | Chen | H04N 19/70 |
| 2024/0155149 A1* | 5/2024 | Zhang | H04N 19/176 |
| 2024/0214579 A1 | 6/2024 | Kidani et al. | |
| 2025/0056014 A1 | 2/2025 | Deng | |

OTHER PUBLICATIONS

Han Gao et al., "Wedge Mode Extensions", Document: CWG-C092_v1, Alliance for Open Media Codec Working Group, Dec. 14, 2022, 4 pgs.

Leo Zhao et al., "Advanced Motion Vector Difference Coding", Document: CWG-B092, Alliance for Open Media, Codec Working Group, Nov. 24, 2021, 7 pgs.

Leo Zhao et al., "Improved Adaptive MVD Resolution", Document:Open Media, Codec Working Group, Feb. 9, 2022, 7 pgs.

Peter de Rivaz et al., "AV1 Bitstream & Decoding Process Specification", The Alliance for Open Media, Jan. 8, 2019, 681 pgs. Retrieved from the Internet: https://aomediacodec.github.io/av1-spec/av1-spec.pdf.

Xin Zhao et al., "Tool Description for AV1 and Libaom", Document: CWG-B078_v1, Alliance for Open Media Codec Working Group, Oct. 4, 2021, 41 pgs.

Yue Chen et al., "An Overview of Core Coding Tools in the AVI Video Codec", 2018 IEEE Picture Coding Symposium, San Francisco, CA, USA, 5 pgs.

Elliott Karpilovsky et al., "Proposal: New Inter Modes for AV2", Alliance for Open Media, Codec Working Group, Document: CWG-B018_v1, Feb. 24, 2021, 6 pgs.

Tencent Technology, ISRWO of 7761-WO, PCT/US2023/032523, Jan. 23, 2024, 15 pgs.

Tencent Technology, ISRWO of 7831-WO, PCT/US2023/032527, Jan. 23, 2024, 20 pgs.

Tencent Technology, ISRWO of 7833-WO, PCT/US2023/032530, Dec. 20, 2023, 14 pgs.

Tencent Technology, ISRWO of 7837-WO, PCT/US2023/032532, Dec. 18, 2023, 6 pgs.

Yoshitaka Kidani et al., "Geometric Partitioning Mode with Inter and Intra Prediction for Beyond Versatile Video Coding", IEICE Transactions on Information and Systems, vol. E105-D, No. 10, Oct. 2022, 13 pgs.

* cited by examiner

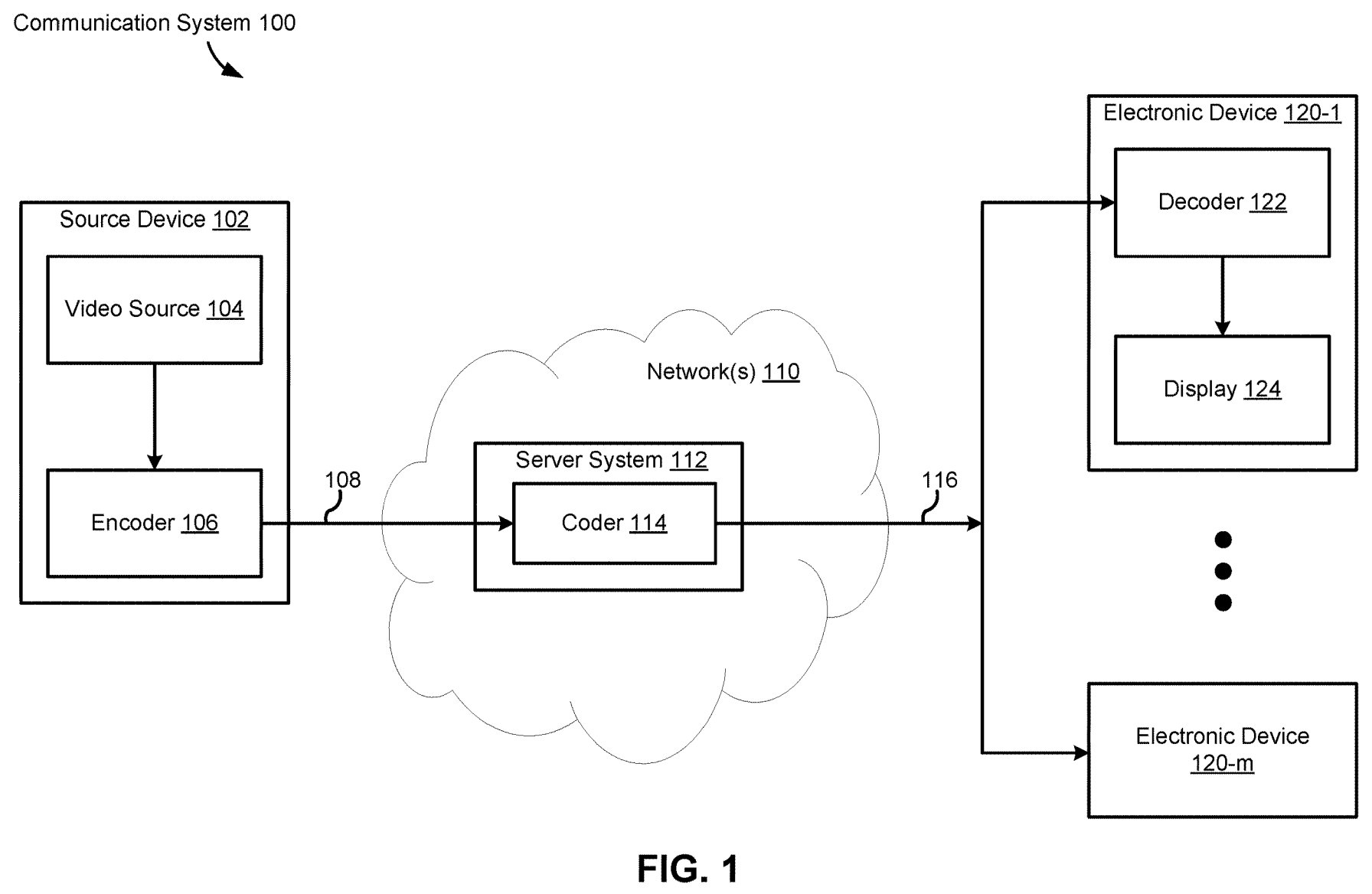

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

Server System
112

Memory 314

Operating System 316

Network Communication Module 318

Coding Module 320

Decoding Module 322

Parsing Module 324

Transform Module 326

Prediction Module 328

Filter Module 330

⋮

Encoding Module 340

Code Module 342

Prediction Module 344

⋮

Picture Memory 352

⋮

⋮

Control
Circuitry 302

312

Network
Interface(s)
304

User Interface 306

Output
Device(s) 308

Input
Device(s) 310

SPLIT_BT_VER

SPLIT_BT_HOR

SPLIT_TT_VER

SPLIT_TT_HOR

FIG. 4D

Vertical Mask
552

Horizontal
Mask 554

Smooth Mask
556

DC Mask
558

1.00

0.75

0.50

0.25

0.00

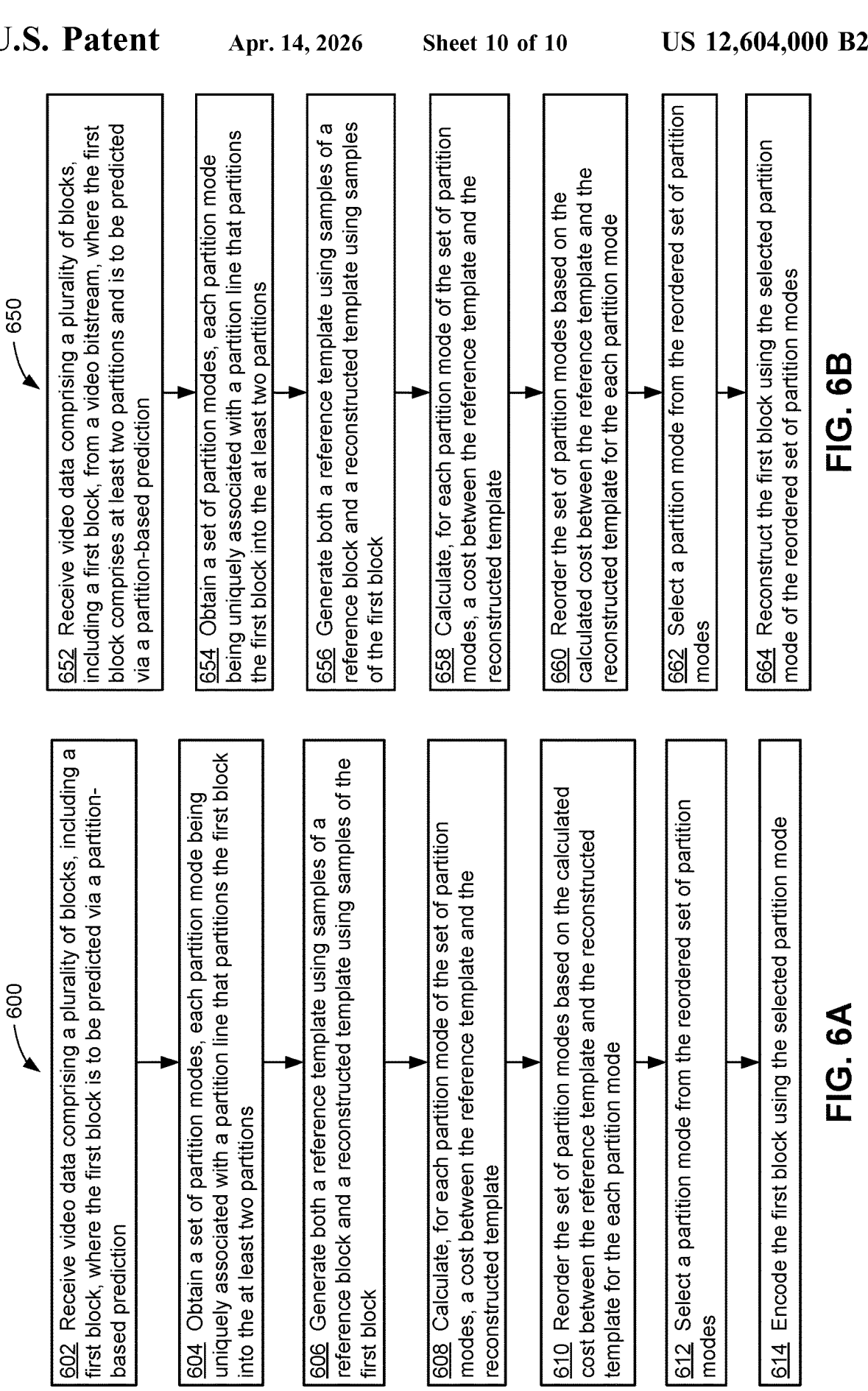

650

652  Receive video data comprising a plurality of blocks, including a first block, from a video bitstream, where the first block comprises at least two partitions and is to be predicted via a partition-based prediction 654  Obtain a set of partition modes, each partition mode being uniquely associated with a partition line that partitions the first block into the at least two partitions 656  Generate both a reference template using samples of a reference block and a reconstructed template using samples of the first block 658  Calculate, for each partition mode of the set of partition modes, a cost between the reference template and the reconstructed template 660  Reorder the set of partition modes based on the calculated cost between the reference template and the reconstructed template for the each partition mode 662  Select a partition mode from the reordered set of partition modes 664  Reconstruct the first block using the selected partition mode of the reordered set of partition modes

602  Receive video data comprising a plurality of blocks, including a first block, where the first block is to be predicted via a partition-based prediction 604  Obtain a set of partition modes, each partition mode being uniquely associated with a partition line that partitions the first block into the at least two partitions 606  Generate both a reference template using samples of a reference block and a reconstructed template using samples of the first block 608  Calculate, for each partition mode of the set of partition modes, a cost between the reference template and the reconstructed template 610  Reorder the set of partition modes based on the calculated cost between the reference template and the reconstructed template for the each partition mode 612  Select a partition mode from the reordered set of partition modes 614  Encode the first block using the selected partition mode

FIG. 6A

SYSTEMS AND METHODS FOR PARTITION-BASED PREDICTION MODE REORDERING

RELATED APPLICATIONS

This application claims priority to U.S. Provisional Patent Application No. 63/443,360, entitled "Improvement of Wedge-Based Prediction Modes Reordering" filed Feb. 3, 2023, which is hereby incorporated by reference in its entirety.

TECHNICAL FIELD

The disclosed embodiments relate generally to video coding, including but not limited to systems and methods for reordering partition-based prediction modes.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As described in more detail below, in some systems, up to 68 partition (wedge split) modes are supported encoding/decoding video blocks. For example, the partition modes may be constructed of 20 angles and 4 offsets for each angle (e.g., with the duplicate cases removed). In a video bitstream, the angle directions (e.g., whether an angle is greater than or smaller than 180 degrees), the indices of angles, and the indices of offsets may be separately signaled in three syntax elements. However, because the frequency of each partition mode is not same, a fixed order of mode signaling is suboptimal. The present disclosure describes methods and systems for reordering the partition modes based on available information (e.g., reference blocks and reference templates). Reordering the partition modes can reduce bandwidth (e.g., using less bits to signal high frequency modes) and/or improve the decoding efficiency.

In accordance with some embodiments, a method of video decoding is provided. The method includes (i) receiving video data comprising a plurality of blocks, including a first block, from a video bitstream: (ii) obtaining a set of partition modes: (iii) generating a reference template for the first block: (iv) reordering the set of partition modes based on the reference template: (v) identifying, from the video bitstream, an index for the reordered set of partition modes; and (vi) reconstructing the first block using a first partition mode of the reordered set of partition modes, where the first partition mode corresponds to the index.

In accordance with some embodiments, a method of video encoding is provided. The method includes (i) receiving video data comprising a plurality of blocks, including a first block: (ii) obtaining a set of partition modes: (iii) generating a reference template for the first block: (iv) reordering the set of partition modes based on the reference template: (v) determining an index for a first partition mode in the reordered set of partition modes: (vi) encoding the first block using the first partition mode; and (vii) transmitting the index via a video bitstream.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder component).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIGS. 4A-4D illustrate example coding tree structures in accordance with some embodiments.

FIG. 6A is a flow diagram illustrating an example method of encoding video in accordance with some embodiments.

FIG. 6B is a flow diagram illustrating an example method of decoding video in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
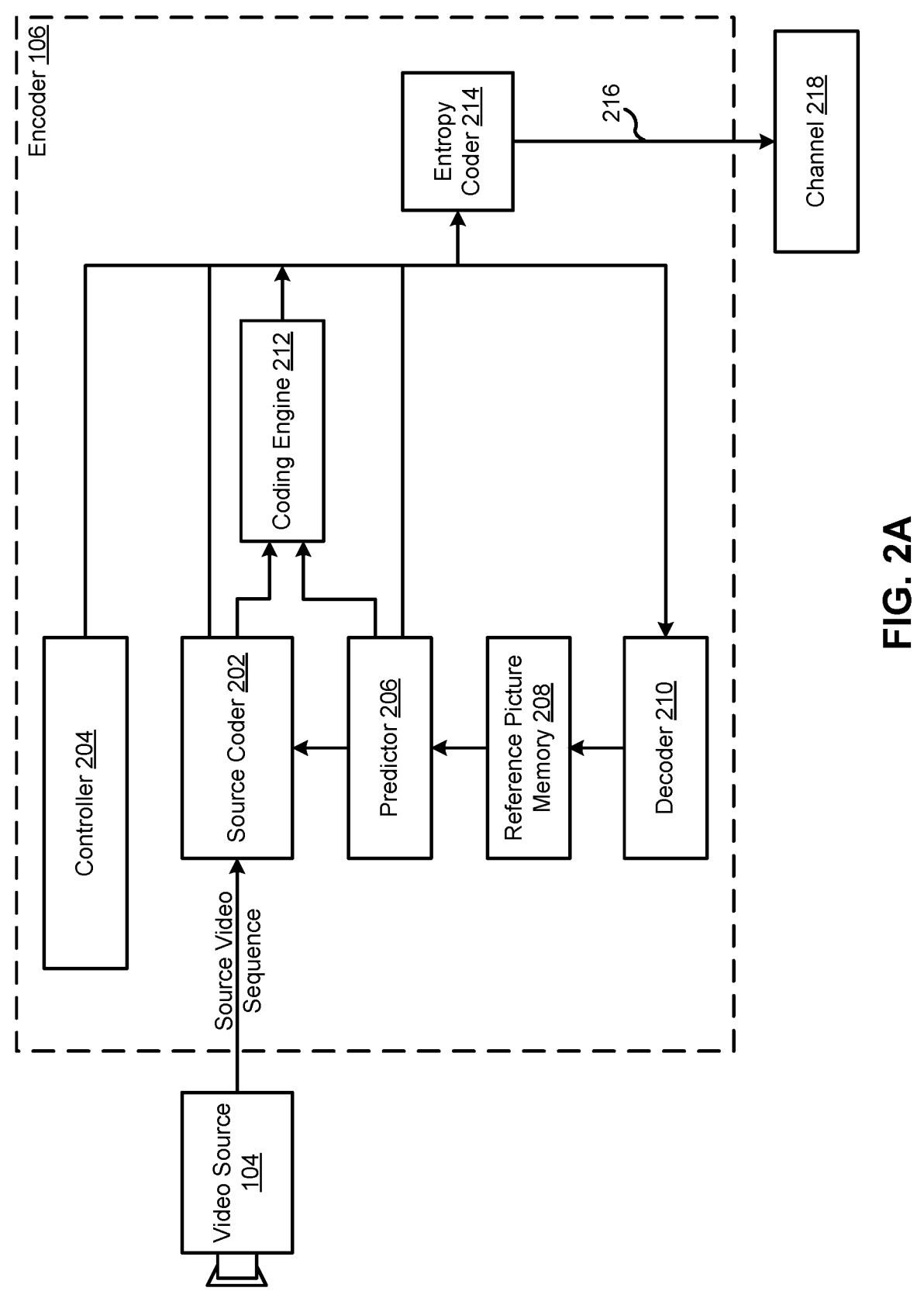
FIG. 2A is a block diagram illustrating example elements of an encoder component in accordance with some embodiments.

The present disclosure describes, among other things, using various partitioning techniques for partitioning video blocks for more optimal motion prediction and higher quality encoding. The present disclosure also describes generating a reordered partition mode list by reordering the partition modes (e.g., wedge split modes) based on available decoder side information. An index with a maximum value, N, may be parsed to indicate the position of the best partition mode in the reordered partition mode list. The index may be coded using multi-symbol entropy coding and the index maximum value may be predefined or signaled in high-level syntax. Reordering the partition modes in this way can improve decoding efficiency.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color-space (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder.

In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors and block shapes, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
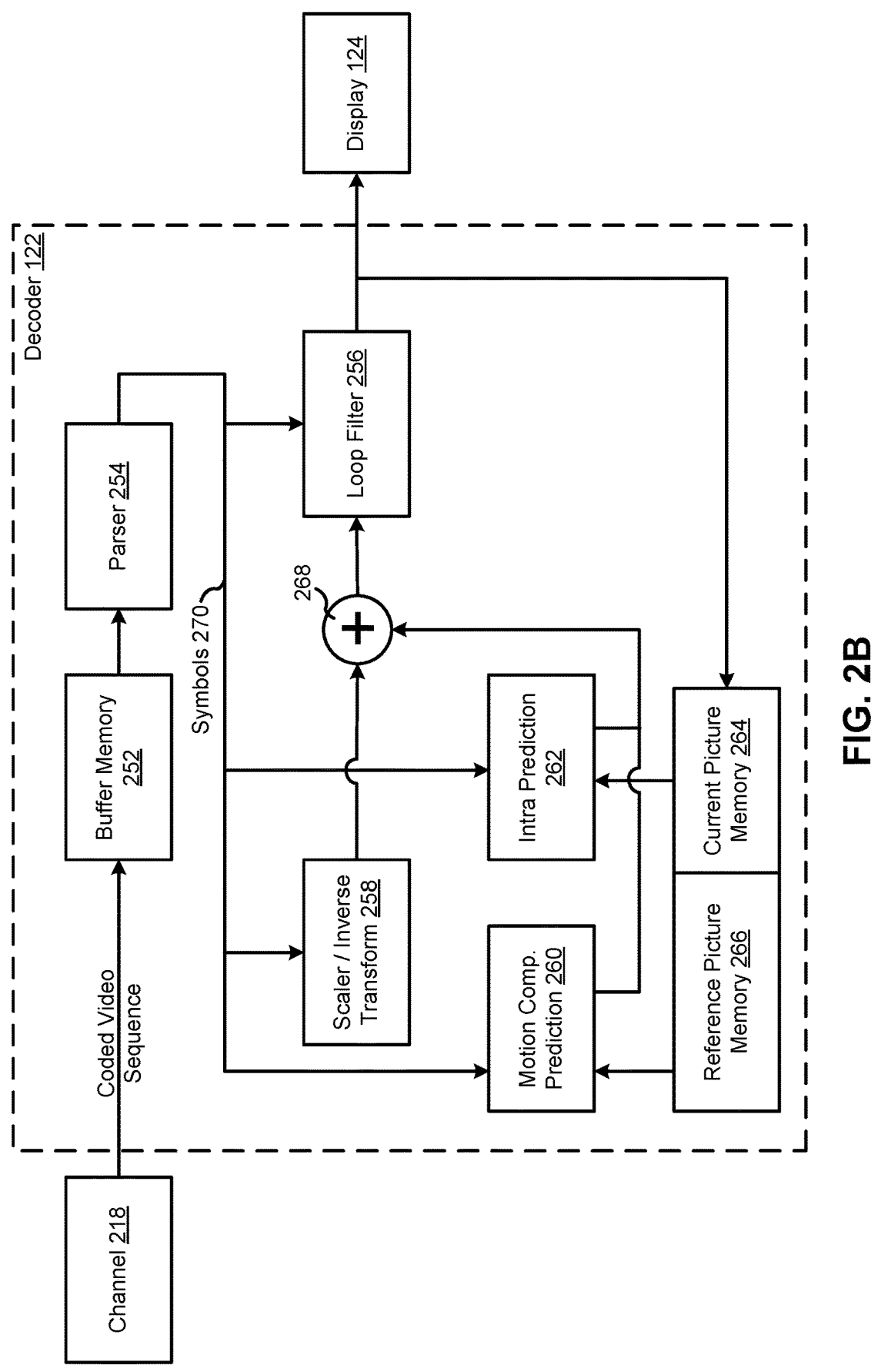
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as one or more integrated circuits and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block: that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
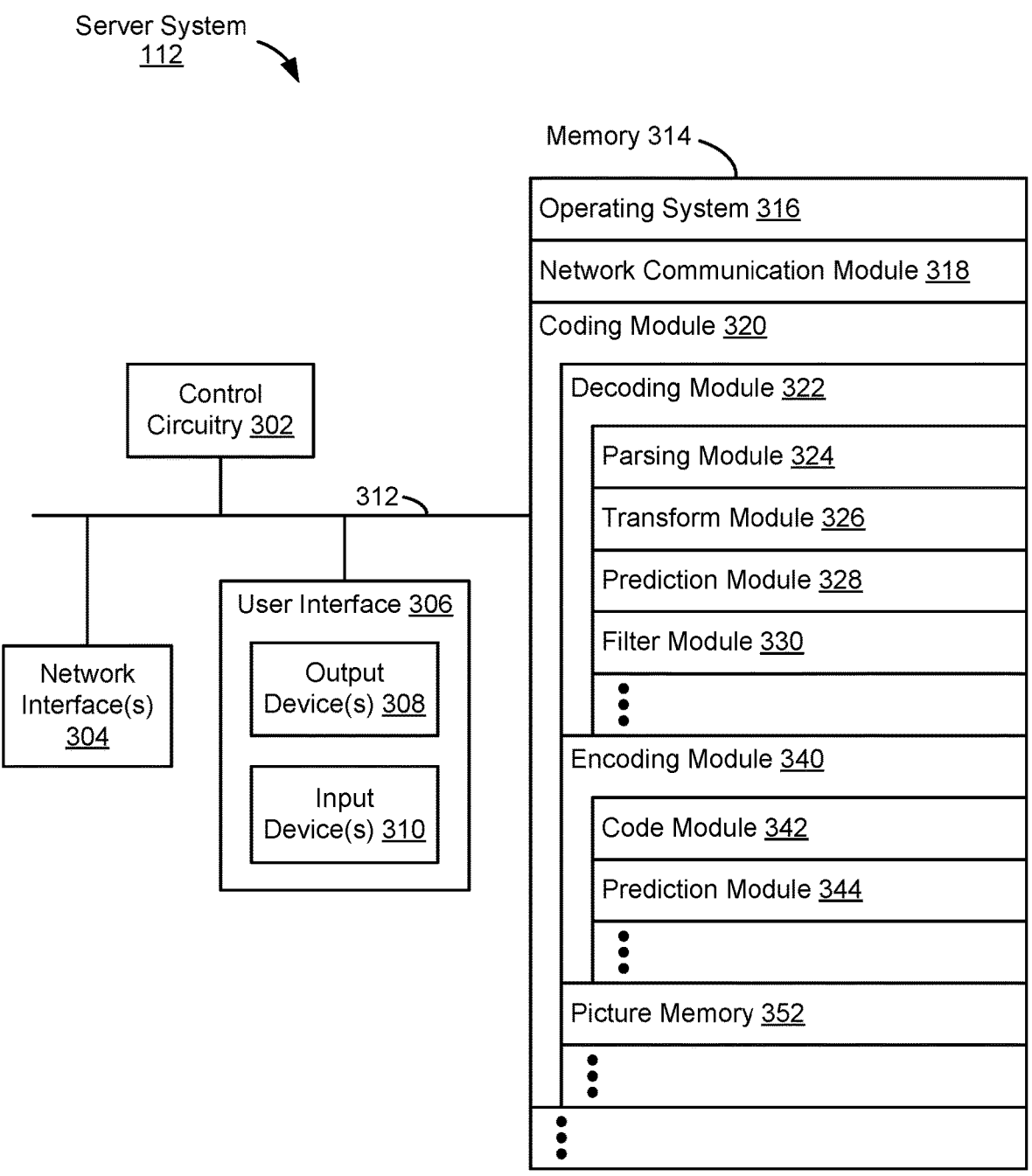
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
- a decoding module 322 for performing various functions with respect to decoding encoded data, such as those described previously with respect to the decoder component 122; and
- an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Processes and Techniques

Figures 4A, 4B, 4C, 4D:
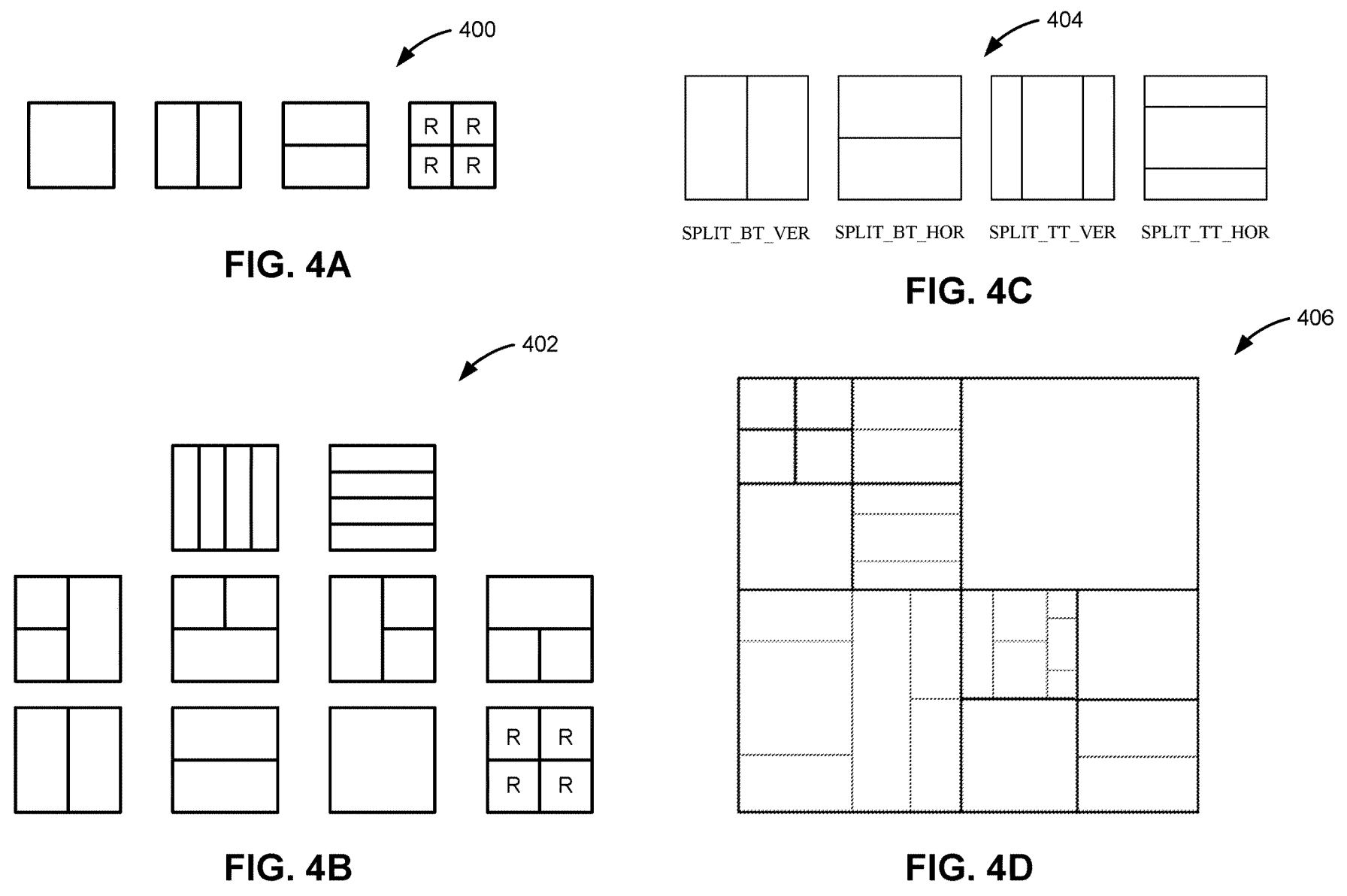

The coding processes and techniques described below may be performed at the devices and systems described above (e.g., the source device 102, the server system 112, and/or the electronic device 120). FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU.

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. A CTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An example of block partitions for one CTU (406) is shown in FIG. 4D, which illustrates an example quadtree with nested multi-type tree coding block structure.

Motion estimation involves determining motion vectors that describe the transformation from one image (picture) to another. The reference image (or block) can be from an adjacent frame in a video sequence. The motion vectors may relate to the whole image (global motion estimation) or a particular block. Additionally, the motion vectors can correspond to a translational model or warped model that approximate the motion (e.g., rotation and translation in three dimensions and zoom). Motion estimated can be improved in some circumstances (e.g., with more complicated video objects) by further partitioning the blocks.

A geometric partitioning mode (GPM) may focus on inter-picture predicted blocks (e.g., CUs). When GPM is applied to a block, the block is split into two parts via a straight partitioning boundary. For example, different from the regular inter prediction performed on rectangular blocks, GPM separates a coding block into two regions by 64 predefined types of straight lines, generates inter predicted samples for each separated region, and then blends them to obtain the final inter predicted samples. The location of the partitioning boundary may be mathematically defined by an angle parameter φ and an offset parameter ρ. These parameters may be quantized and combined into a GPM partitioning index lookup table. The GPM partitioning index of the current block may be coded into the bitstream. For example, 64 partition modes are supported by GPM in VVC for a CU with a size of w×h=$2^k$×$2^l$ (in terms of luma samples) with k, l∈{3 . . . 6}. GPM may be disabled on a CU that has an aspect ratio larger than 4:1 or smaller than 1:4, e.g., because narrow CUs rarely contain geometrically separated patterns.

After partitioning, the two GPM sections (partitions) contain individual motion information that can be used to predict the corresponding sections in the current block. In some embodiments, only a unidirectional motion-compensated prediction (MCP) is allowed for each section of the GPM so that the required memory bandwidth for MCP in the GPM is equal to that for the regular bidirectional MCP. To simplify the motion information coding and reduce the possible combinations for the GPM, the motion information can be coded with merge mode. The GPM merge candidate list can be derived from the conventional merge candidate list, to ensure that only unidirectional motion information is contained.

Figure 5A:
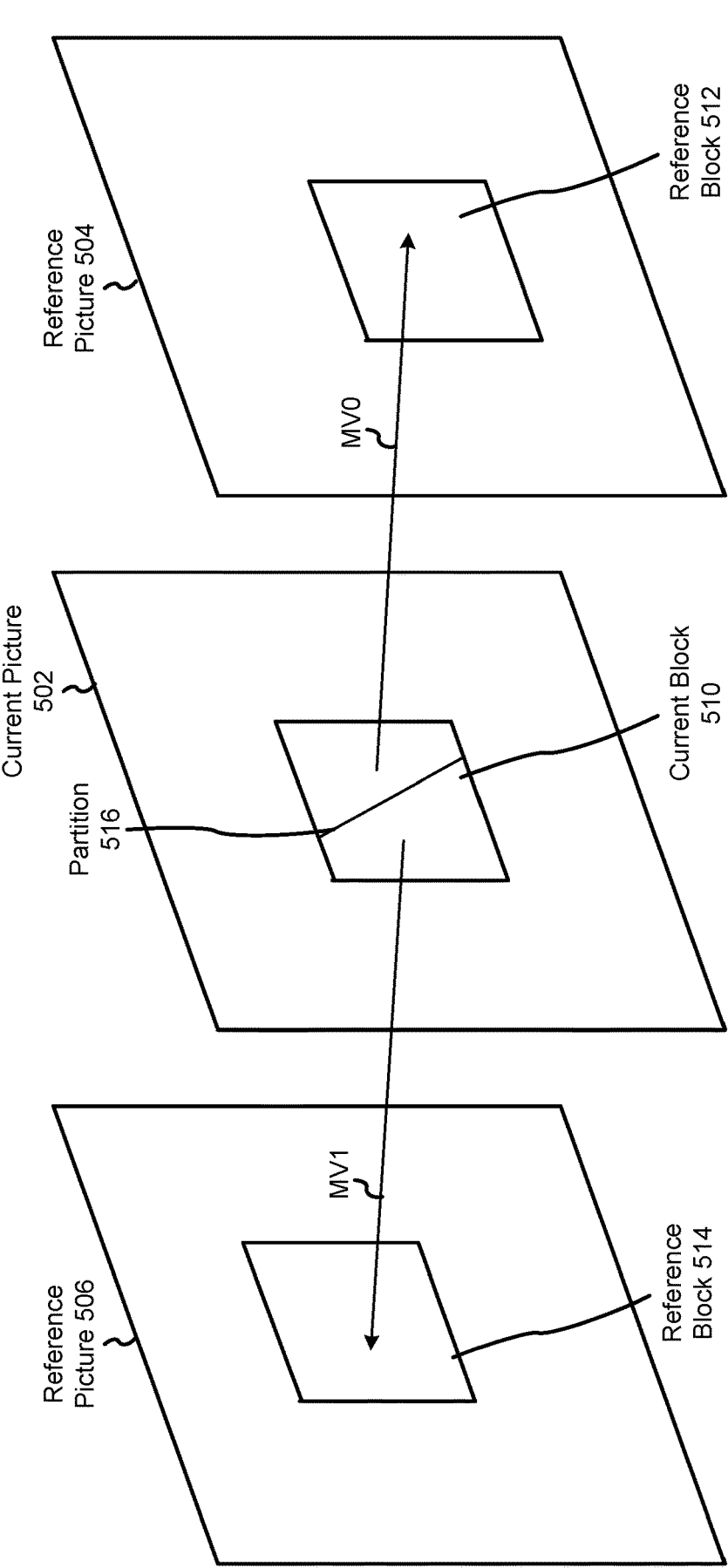
FIG. 5A shows an example of a partition-based prediction mode in accordance with some embodiments.

FIG. 5A illustrates a prediction process of GPM in accordance with some embodiments. A current block 510 is partitioned into a right-side section and a left-side section via a partition 516. The right-side predicted part of the current block 510 (e.g., a CU) of a current picture 502 (e.g., with a size of w×h) is predicted by MV0 from reference block 512 of reference picture 504, whereas the left-side part is predicted by MV1 from reference block 514 of reference picture 506.

Figure 5B:
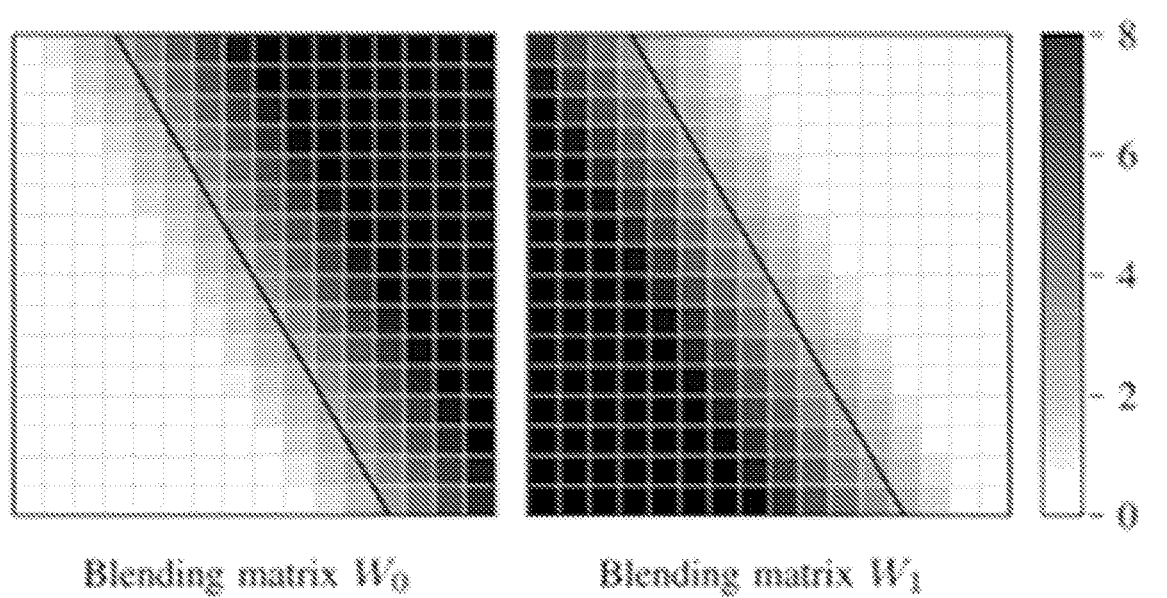
FIGS. 5B-5C show example partitioning mode blendings in accordance with some embodiments.

In some embodiments, when a current block is split into two partitions via a partition (e.g., the partition 516), blending (e.g., corresponding to a "blending mode" or "masked blending") is applied to combine the two partitioned blocks. FIG. 5B illustrates example blending matrices for a partition (e.g., the partition 516) in accordance with some embodiments. In this example, a final GPM prediction (PG) is generated by performing a blending process using integer blending matrices W0 and W1, e.g., containing weights in the value range of 0 to 8. This can be expressed as:

Equation 1—Blended Prediction $$PG = (W0 \circ P0 + W1 \circ P1 + 4) \gg 3$$

with $$W0 + W1 = 8J$$

In Equation 1, J is a matrix of ones with a size of w×h. The weights of the blending matrix may depend on the displacement between the sample location and the partitioning boundary. The computational complexity of blending matrices derivation can be low, so that these matrices can be generated on-the-fly at the decoder side.

The generated GPM prediction (PG) can then be subtracted from the original signal to generate the residuals. The residuals may be transformed, quantized, and coded into the bitstream, e.g., using the regular VVC transformation, quantization, and entropy coding engines. At the decoder side, the signal is reconstructed by adding the residuals to the GPM prediction PG. A skip mode can also be supported by GPM, e.g., when the residuals are negligible. For example, the residual is dropped by the encoder, and the GPM prediction PG is directly used by the decoder as the reconstructed signal.

Figure 5C:
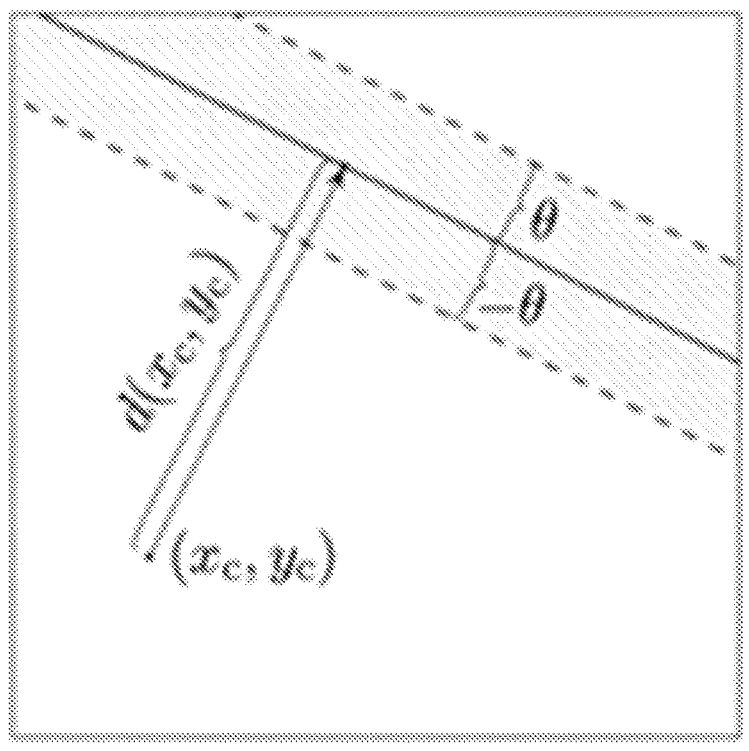

The GPM can be further enhanced, e.g., by GPM+TM (bilateral matching), GPM+MMVD (merge mode with motion vector difference), and Inter+Intra GPM. As shown in FIG. 5C, the blending strength or blending area width $\theta$ may be fixed for all different contents. In some embodiments, the weighing values in the blending mask are given by a ramp function:

Equation 2—Blending Ramp Function $$
\omega_{x_c,y_c} = \begin{cases} 0 & d(x_c, y_c) \le -\theta \\ \dfrac{8}{2\theta} \left( d(x_c, y_c) + \theta \right) & -\theta < d(x_c, y_c) < \theta \\ 8 & d(x_c, y_c) \ge \theta, \end{cases}
$$

For example, with a fixed $\theta=2$ pel. This ramp function can be quantized as:

Equation 3—Quantized Ramp Function $$
\omega_{m,n} = \text{Clip3}(0, 8, (d(m, n) + 32 + 4) \gg 3)
$$

Such a design may be not always optimal because the fixed blending area width cannot always provide the best blending quality for various types of video contents. For example, video contents usually contain strong textures and sharp edges, which require a narrow blending area to preserve the edge information. For camera-captured content, blending is generally required: but the blending area width may be dependent on a number of factors, e.g., the actual boundaries of the moving objects and the motion distinctiveness of two partitions.

To address this issue, an adaptive blending scheme can be used for the GPM, which dynamically adjusts the width of the blending area surrounding the GPM partition boundary. For example, the width of the blending area ($\theta$) can be selected from a set of pre-defined values {0, 1, 2, 4, 8}. The optimal blending area width can be determined for each GPM block at the encoder and signaled to the decoder based on a syntax element, e.g., merge_gpm_blending_width_idx. As an example, all predefined blending strength values may be shiftable while all the clipping and shifting operations in the GPM blending process may be kept without any changes.

In addition, the range of the weights may be increased from [0, 8] to [0, 32] to accommodate the increased width of the GPM blending area. Specifically, the weights can be calculated as:

Equation 4—Increased Quantized Ramp Function $$
\omega_{x_c,y_c} = \begin{cases} \text{Clip3}(0, 32, (d(m, n) + 16\theta + (\theta \gg 1)) \gg \log_2 \theta) & \theta \neq 0 \\ d(m, n) > 0 \ ? \ 32{:}0 & \theta = 0 \end{cases}
$$

Figure 5D:
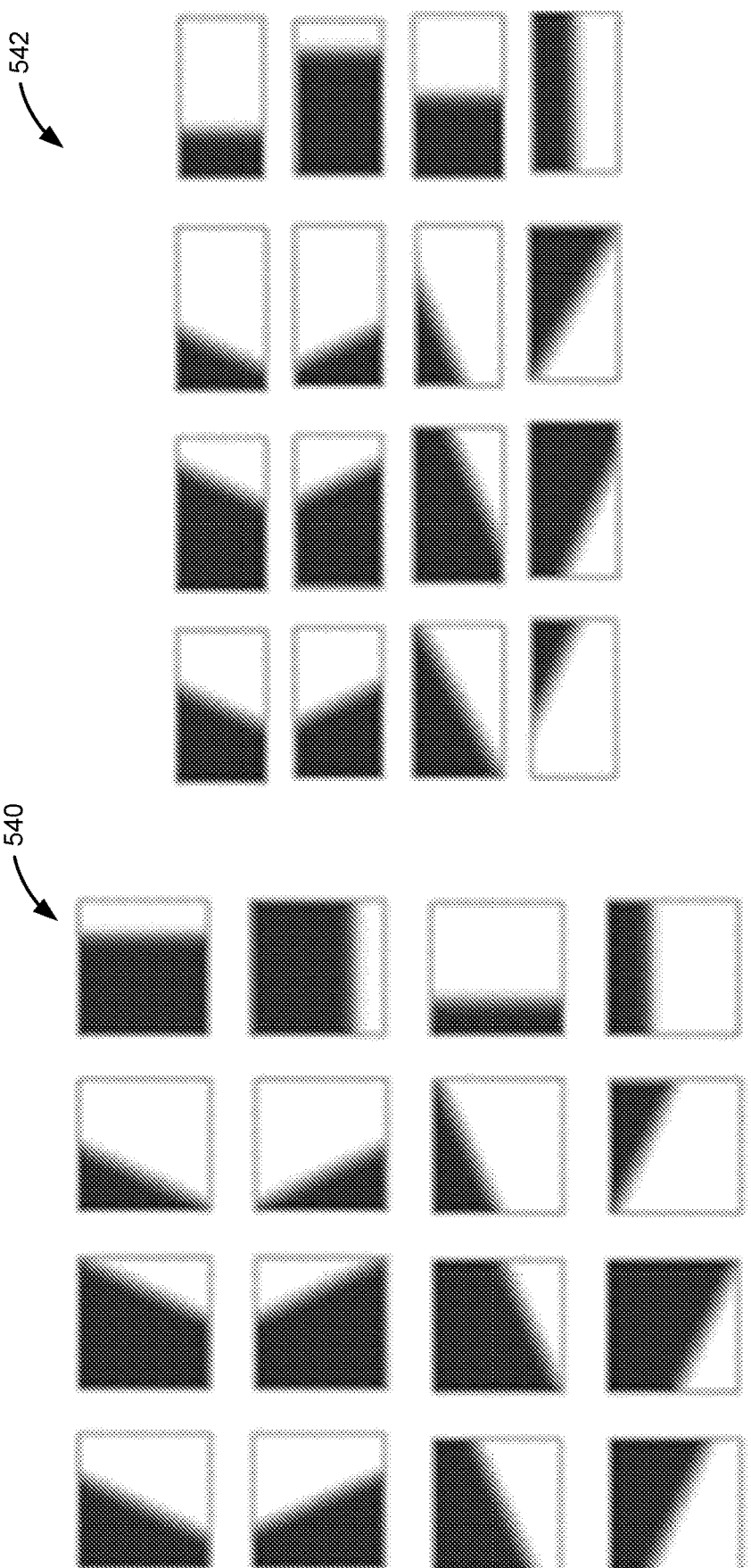
FIG. 5D shows example wedge-based partitioning in accordance with some embodiments.

Wedge-based prediction is a compound prediction mode (e.g., in AV1), which is similar to GPM. The wedge-based prediction can be used for both inter-inter and inter-intra combinations. For example, a set of 16 coefficient arrays may be preset for each eligible block size. They effectively split the coding block into two sections along various oblique angles. Boundaries of moving objects are often difficult to approximate by on-grid block partitions. A solution is to predefine a codebook of possible wedge partitions (e.g., 16) and to signal the wedge index in the bitstream when a coding unit is to be further partitioned in such a way. In the current wedge design in AV1, 16 modes are supported because a maximum 16 symbols can be signaled in one syntax element with the multi-symbol adaptive context coding used in AV1. The 16-ary shape codebooks containing partition orientations that are either horizontal, vertical, or oblique (e.g., with slopes ±2 or ±0.5) are designed for both square blocks 540 and rectangular blocks 542 as shown in FIG. 5D, and correspond to individual partition modes. To mitigate spurious high-frequency components, which often are produced by directly juxtaposing two predictors, soft-cliff-shaped 2-D wedge masks may be employed to smooth the edges around the intended partition (e.g., m(i, j) is close to 0.5 around the edges and gradually transforms into binary weights at either end). A partition-based prediction is a prediction that partitions a current block into sections and applies different predictors for each section. GPM and wedge-based prediction (discussed above) are examples of partition-based prediction modes.

Figure 5E:
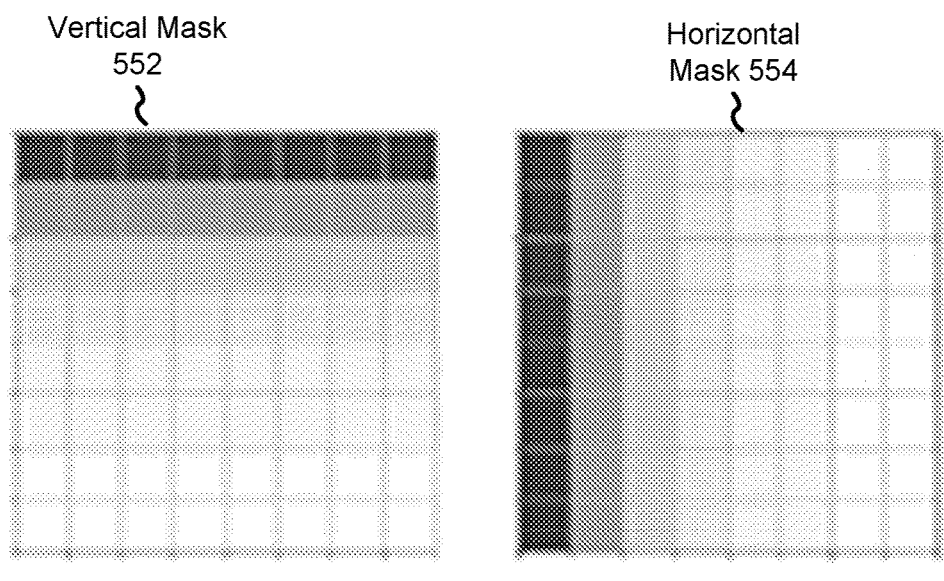
FIG. 5E shows example inter-intra mask weights in accordance with some embodiments.
Figure 5E:
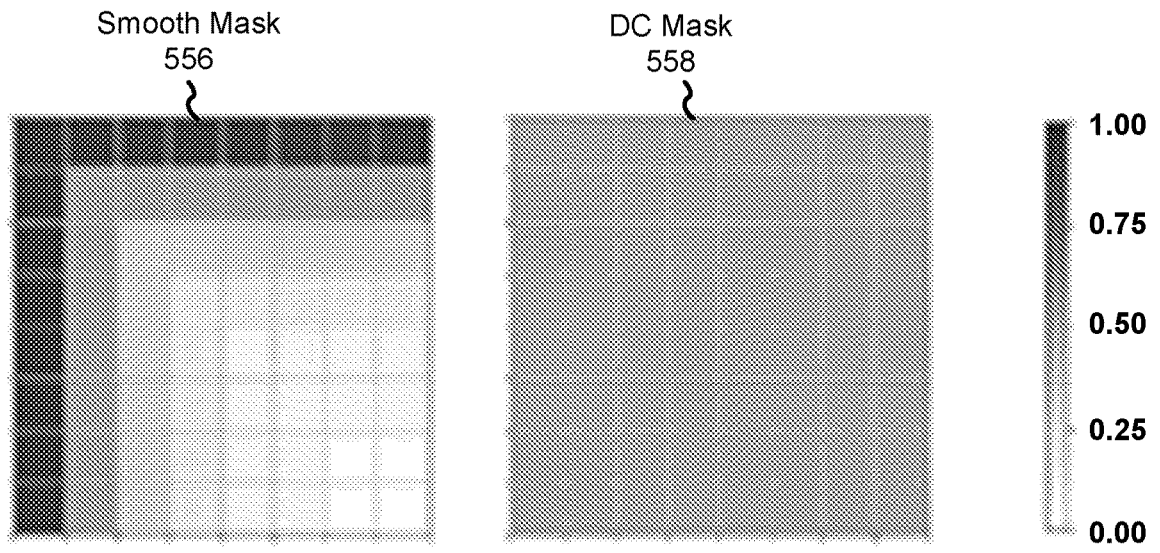

An inter-intra prediction mode is a compound prediction mode that combines an inter predictor and an intra predictor. The inter predictor of an inter-intra mode may be generated using a single predictor as described elsewhere herein. In some embodiments, the intra predictor is limited to four intra prediction modes: DC, vertical, horizontal, and smooth. The inter and intra predictors may be combined together either in a smooth inter-intra mode or a wedge inter-intra mode. For the wedge inter-intra mode, the inter predictor and intra predictor may be combined together using a wedge mask. For the smooth inter-intra mode, the mask used to combine inter and intra predictors may depend on the intra mode. Example normalization mask weights for vertical (vertical mask 552), horizontal (horizontal mask 554), smooth (smooth mask 556), and DC (DC mask 558) modes are illustrated in FIG. 5E.

Predictions can be combined in more advanced ways than a simple average in a block, including smooth and sharp transition gradients in different directions (e.g., wedge-based predictions) as well as implicit masks that are based on the difference between the two predictors. This allows the combination of either two inter predictions or an inter and an intra prediction to be used in the same block. The wedge modes in AV1 described above may be extended to allow for wedge modes to be used for 64×64, 32×64, 64×32, 16×64, and 64×16 blocks. Additionally, the wedge modes (also sometimes called wedge split modes) may be defined in the Hessian norm form, where an angle indicates the direction of the split boundary, and a distance indicates the offset of the split boundary from the center of a block. The angles may be quantized into values (e.g., 20 values) using tangent values. The distances may be quantized based on block sizes. For example, three distances may be used for angles larger than or equal to 180 degrees, and for 0-degree or 90-degree angles. Four distances may be used for the other angles. In this way, 8×4+12×3=68 modes may be supported. Because more than 16 modes are supported, the wedge index may be signaled with three syntax elements, e.g., the angle direction, angle, and distance. The angle direction indicates whether the angle is smaller than 180 degrees. Depending on the angle direction, the actual angle may be signaled. Depending on the signaled angles, the distance may be signaled.

The wedge blending mask may be quantized directly from the distance between a sample position to the split boundary. Using the Hessian norm form split boundary definition, the distance can be defined as:

Equation 5—Blending Mask Distances $$d(x, y) = x \cos(\varphi) - y \sin(\varphi) + \rho$$

where $\rho$ is the distance from the center and $\varphi$ is the partition angle. The angles and distances may be quantized by using tangent value and block sizes. Therefore, only lookup tables and shift operations may be needed to calculate the quantized d(m, n) as shown below in Equation 6.

Equation 6—Quantized Distances $d(m, n) =$ $(((m + \rho_x) \ll 1) - w + 1)\cos LUT[\varphi_i] + (((n + \rho_y) \ll 1) - h + 1)\sin LUT[\varphi_i]$ The blending weight at a corresponding location may be derived using Equation 7:

Equation 7—Blending Weights $$\omega_{m,n} = \text{clamp } (0, 64, (d(m, n) + 32))$$

The blending weights may be computed on the fly (e.g., because the computational complexity is low), or prestored (e.g., as with the AV1 wedge mode design).

In some systems up to 68 wedge split modes are supported. The wedge split modes may be constructed using 20 angles and 4 offsets for each angle (with the overlap cases removed). In the bitstream, the angle directions (e.g., whether the angle is larger or smaller than 180 degrees), the indices of angles, and the indices of offsets may be separately signaled in three syntax elements. However, because the frequency of each wedge mode is different, a fixed order of mode signaling is suboptimal. The methods and processes described below incorporate reordering a list of wedge split modes (or other partition modes) to improve efficiency and/or reduce transmission bandwidth.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data comprising a plurality of blocks, including a first block, where the first block is to be predicted via a partition-based prediction. The system obtains (604) a set of partition modes, each partition mode being uniquely associated with a partition line that partitions the first block into the at least two partitions. The system generates (606) both a reference template using samples of a reference block and a reconstruction template using samples of the first block. The system calculates (608), for each partition mode of the set of partition modes, a cost between the reference template and the reconstruction template. The system reorders (610) the set of partition modes based on the calculated cost between the reference template and the reconstruction template for the each partition mode. The system selects (612) a partition mode from the reordered set of partition modes. The system encodes (614) the first block using the selected partition mode. In some embodiments, the system transmits the encoded first block via a video bitstream. In some embodiments, the system transmits an index corresponding to the selected partition mode in the video bitstream.

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data comprising a plurality of blocks, including a first block, from a video bitstream, where the first block comprises at least two partitions and is to be predicted via a partition-based prediction. The system obtains (654) a set of partition modes, each partition mode being uniquely associated with a partition line that partitions the first block into the at least two partitions. The system generates (656) both a reference template using samples of a reference block and a reconstruction template using samples of the first block. The system calculates (658), for each partition mode of the set of partition modes, a cost between the reference template and the reconstruction template. The system reorders (660) the set of partition modes based on the calculated cost between the reference template and the reconstruction template for the each partition mode. The system selects (662) a partition mode from the reordered set of partition modes. The system reconstructs (664) the first block using the selected partition mode of the reordered set of partition modes.

Although FIGS. 6A and 6B illustrates a number of logical stages in particular orders, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The systems described herein may be used for GPM or wedge-based partitioning. In some embodiments, at the decoder side, the partition modes (e.g., wedge split modes) are reordered depending on available decoder side information. A reordered wedge split mode list is generated and an index with maximum value N (where N is smaller than or equal to maximum number of partition modes) is parsed to indicate the position of the best partition mode in the reordered partition mode list. The index may be coded using multi-symbol entropy coding and the index maximum value N may be predefined or signaled in high-level syntax.

In some embodiments, the reordering is dependent on the cost of a template. For example, a reference template is generated using the top and left M lines of integer position samples of a reference block based on the integer value of a motion vector (MV) for each partition and is further blended using a partition mode. A reconstruction template is generated using the top and left M lines of samples of the current block in the current frame. The cost between the reference template and the reconstruction template is calculated for all partition modes and the modes are reordered accordingly. Using only integer position samples in the reference frame avoids the interpolation process and reduces the decoder side complexity. Specifically, the disclosed method (e.g., B1 described below) can obtain a set of partition modes. Here, each partition mode being uniquely associated with a partition line that partitions the first block into at least two partitions. The disclosed method can then generate a reference template using samples of a reference block and a reconstruction template using samples of the current block. Furthermore, the disclosed method can calculate a cost between the reference template and the reconstruction template for each partition mode of the set of partition modes and reorder the set of partition modes based on the calculated cost. Then, the disclosed method can select a partition mode from the reordered set of partition modes and reconstruct the current block using the selected partition mode.

In some embodiments, the reference template is generated using the top and left M lines of fractional position samples (which are interpolated using parsed MVs) of the reference block and blended using one partition mode. Using fractional position samples of the reference frames increases the accuracy of the template generation and, thus, the reordering accuracy is increased.

In some embodiments, the partition mode and partition sign, which indicates which part is predictor 0 and which part is predictor 1, are listed and reordered together, and the top N best modes are used (e.g., the 48 best modes). The partition mode and partition sign may be signaled separately or jointly as the index of the reordered mode/sign list.

In some embodiments, the partition sign is signaled and, depending on the partition sign, the partition modes are reordered. The top N best modes may be used, and the index that indicates the position of the best mode in the reordered list may be signaled.

In some embodiments, the partition mode signaling is separated as partition angle and partition offsets, the angles are reordered (as described above), and the index indicates the position of the reordered angle list. In some embodiments, the partition mode signaling is separated as partition angle and partition offsets, the offsets of each angle are reordered (as described above), and the index indicates the position of the reordered offsets list.

In some embodiments, when signaling the top N best modes, the index is further grouped into different groups, and the group index (e.g., wedge_group_idx) is first signaled and then the relative index of the selected partition mode (e.g., wedge_group_mode_idx) in the selected group is further signaled. In some embodiments, which wedge split modes are included in a certain wedge group is determined by the associated reordered indices. For example, the number of wedge split modes in a group is less than or equal to 16. In some embodiments, the group index (wedge_group_idx) and/or the selected wedge split mode (wedge_group_mode_idx) is signaled using multi-symbol arithmetic coding.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving video data comprising a plurality of blocks, including a first block and a reference block associated with the first block, where the first block is to be predicted via a partition-based prediction: (ii) obtaining a set of partition modes, each partition mode being uniquely associated with a partition line that partitions the first block into the at least two partitions: (iii) generating both a reference template using samples of a reference block and a reconstruction template using samples of the first block; (iv) calculating, for each partition mode of the set of partition modes, a cost between the reference template and the reconstruction template: (v) reordering the set of partition modes based on the calculated cost between the reference template and the reconstruction template for the each partition mode: (vi) selecting a partition mode from the reordered set of partition modes; and (vii) encoding the first block using the selected partition mode of the reordered set of partition modes. In some embodiments, each partition mode in the set of partition modes corresponds to a respective partition sign of a set of partition signs, and reordering the set of partition modes based on the reference template comprises reordering the set of partition signs. In some embodiments, each partition mode in the set of partition modes corresponds to a respective partition sign of a set of partition signs, a first partition sign of the set of partition signs is signaled in the video bitstream, and the set of partition modes are reordered based on the first partition sign. In some embodiments, each partition mode in the set of partition modes corresponds to a respective partition angle of a set of partition angles and a respective partition offset of a set of partition offsets, and reordering the set of partition modes comprises reordering the set of partition angles. In some embodiments, each partition mode in the set of partition modes corresponds to a respective partition angle of a set of partition angles and a respective partition offset of a set of partition offsets, and reordering the set of partition modes comprises reordering the set of partition offsets. In some embodiments, the reordered set of partition modes is grouped into a plurality of groups, the method further includes signaling an index for the selected partition mode and signaling a group index of a selected group of the plurality of groups, where the index is a relative index of the first partition mode of the selected group.

(A2) In some embodiments of A1, the method further includes transmitting an index corresponding to the selected partition mode via the video bitstream.

(A3) In some embodiments of A1 or A2, the reference template is generated using top and left lines of integer position samples of the reference block, and the reconstruction template generated is using the top and left lines of samples of the first block.

(A4) In some embodiments any of A1-A3, the reference template is further generated using additional fractional samples of the reference block. In some embodiments, the reference template is generated using integer samples of the reference block and blended using additional fractional samples of the reference block.

(A5) In some embodiments of any of A1-A4, the reordered set of partition modes is a subset of the set of partition modes. For example, the reordered set of partition modes corresponds to the top M modes based on template cost. In some embodiments, the reordered set of partition modes is a subset of the set of partition modes, and an index for the reordered set of partition modes is obtained from the video bitstream.

(A6) In some embodiments of any of A1-A5, an index for the selected partition mode is coded using multi-symbol entropy coding. In some embodiments, a maximum value for the index is predefined or signaled in high-level syntax. For example, the high-level syntax corresponds to a sequence level, a frame level, a slice level, or a tile level. In some embodiments, the high-level syntax is higher than a block level. As an example, the high-level syntax may include a video parameter set (VPS), a sequence parameter set (SPS), a picture parameter set (PPS), an adaptive parameter set (APS), a slice header, a picture header, a tile header, and/or a CTU header.

(B1) In another aspect, some embodiments include a method (e.g., the method 650) of video decoding. In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254), a motion prediction component (e.g., the motion compensation prediction unit 260), and/or an intra prediction component (e.g., intra picture prediction unit 262). The method includes: (i) receiving video data (e.g., a coded video sequence) comprising a plurality of blocks, including a first block and a reference block associated with the first block, from a video bitstream, where the first block is to be predicted via a partition-based prediction: (ii) obtaining a set of partition modes (e.g., the wedge modes illustrated in FIG. 5D), each partition mode being uniquely associated with a partition line that partitions the first block into the at least two partitions: (iii) generating both a reference template using samples of a reference block and a reconstruction template using samples of the first block: (iv) calculating, for each partition mode of the set of partition modes, a cost between the reference template and the reconstruction template: (v) reordering the set of partition modes based on the calculated cost between the reference template and the reconstruction template for the each partition mode: (vi) selecting a partition mode from the reordered set of partition modes; and (vii) reconstructing the first block using the selected partition mode of the reordered set of partition modes. For example, the set of partition modes are a set of wedge split modes. As another example, the set of partition modes are a set of geometric partition modes. As another example, at the decoder side, wedge split modes are reordered depending on available decoder side information and a reordered wedge split mode list is generated. In some embodiments, the reference template is generated using only samples of the reference block that correspond to integer values. For example, the reference template is generated using the top and left M lines of integer position samples of the reference block based on the integer value of a motion vector (MV) for each wedge partition and is further blended using one wedge split mode.

(B2) In some embodiments, the reference template is generated using top and left lines of integer position samples of the reference block, and wherein the reconstruction template generated is using the top and left lines of samples of the first block. In this example, a reconstruction template is generated using the top and left M lines of samples of the current block in the current frame. The cost between the reference template and the reconstruction template is calculated for all the wedge split modes and all of these modes are reordered accordingly. Using only integer position samples in the reference frame avoids the interpolation process and reduces the decoder side complexity.

(B3) In some embodiments of B1 or B2, the reference template is further generated using additional fractional samples of the reference block. For example, the reference template is generated using the top and left M lines of fractional position samples (which are interpolated using the parsed MVs) of the reference block and blended using a wedge split mode. In this example, the reconstruction template is generated using the top and left M lines of samples of the current block in the current frame. The cost between the reference template and the reconstruction template is calculated for all the wedge split modes and these modes are reordered accordingly. Using fractional position samples of the reference frames increases the accuracy of the template generation, which increases the reordering accuracy. In some embodiments, the reference template is generated using integer samples of the reference block and blended using additional fractional samples of the reference block.

(B4) In some embodiments of any of B1-B3, the reordered set of partition modes is a subset of the set of partition modes. For example, only the top N best modes (e.g., the top 48 modes out of 80 total modes) are included in the reordered set. In some embodiments, an index for the reordered set of partition modes is obtained from the video bitstream (B5) In some embodiments of any of B1-B4, each partition mode in the set of partition modes corresponds to a respective partition sign of a set of partition signs, and reordering the set of partition modes based on the reference template comprises reordering the set of partition signs. For example, the wedge split mode and wedge sign, which indicates which part is predictor 0 and which part is predictor 1, are listed and reordered together, and optionally the top N best modes are used. In some embodiments, the set of split modes and the set of partition signs are signaled separately. For example, the wedge split mode and wedge sign can be signaled separately or jointly as the index of the reordered mode/sign list.

(B6) In some embodiments of any of B1-B4, each partition mode in the set of partition modes corresponds to a respective partition sign of a set of partition signs, a first partition sign of the set of partition signs is signaled in the video bitstream, and reordering the set of partition modes comprises reordering the set of partition modes based on the first partition sign. For example, the wedge sign is first signaled and, depending on the wedge sign, the wedge split modes are reordered. The top N best modes may be used, and the index that indicates the position of the best mode in the reordered list is signaled.

(B7) In some embodiments of any of B1-B4, each partition mode in the set of partition modes corresponds to a respective partition angle of a set of partition angles and a respective partition offset of a set of partition offsets, and reordering the set of partition modes comprises reordering the set of partition angles. For example, the wedge split mode signaling is separated as wedge angle and wedge offsets. In this example, the angles are reordered, and the index indicates the position of the reordered angle list.

(B8) In some embodiments of any of B1-B4, each partition mode in the set of partition modes corresponds to a respective partition angle of a set of partition angles and a respective partition offset of a set of partition offsets, and reordering the set of partition modes comprises reordering the set of partition offsets. For example, the wedge split mode signaling is separated as wedge angle and wedge offsets. In this example, the offsets of each angle are reordered, and the index indicates the position of the reordered offsets list.

(B9) In some embodiments of any of B1-B8, the reordered set of partition modes is grouped into a plurality of groups, the method further includes signaling a group index of a selected group of the plurality of groups, and the index is a relative index of the first partition mode of the selected group. For example, the index is grouped into different groups, and the group index (wedge_group_idx) is first signaled and then the relative index of the selected wedge split mode (wedge_ group_mode_idx) in the selected group is further signaled. In some embodiments, the plurality of groups corresponds to a top N best modes. In some embodiments, particular partition modes of the reordered set of partition modes are assigned to a particular group of the plurality of groups based on the associated reordered indices. For example, which wedge split modes are included in a certain wedge group are determined by their associated reordered indices. As an example, the number of wedge split modes in a group is less than or equal to 16.

(B10) In some embodiments of any of B1-B9, the index is coded using multi-symbol entropy coding. For example, the group index (wedge_group_idx) and/or the selected wedge split mode (wedge_group_mode_idx) is signaled using multi-symbol arithmetic coding.

(B11) In some embodiments of any of B1-B10, a maximum value for the index is predefined or signaled in high-level syntax. As an example, an index with a maximum value N (where N smaller than or equal to maximum number of wedge split modes) is parsed to indicate the position of the best wedge split mode in the reordered wedge mode list. For example, the index maximum value N is predefined or signaled in the high-level syntax.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A6 and B1-B11 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A6 and B1-B11 above).

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving video data comprising a plurality of blocks, including a first block and a reference block associated with the first block, from a video bitstream, wherein the first block comprises at least two partitions and is to be predicted via a partition-based prediction;

obtaining a set of partition modes for partitioning the first block, each partition mode being uniquely associated with a partition line that partitions the first block into the at least two partitions, wherein each partition mode in the set of partition modes corresponds to a respective partition angle of a set of partition angles and a respective partition offset of a set of partition offsets;

generating both a reference template using samples of the reference block and a reconstruction template using samples of the first block, wherein the reference template is generated using integer samples of the reference block and blended using additional fractional samples of the reference block;

calculating, for each partition mode of the set of partition modes, a cost between the reference template and the reconstruction template;

reordering the set of partition angles corresponding to the set of partition modes based on the calculated cost between the reference template and the reconstruction template for each partition mode;

obtaining, from the video bitstream, an index value indicating a partition angle from the reordered set of partition angles;

selecting a partition mode according to the index value indicating the partition angle from the reordered set of partition angles and a partition offset of the set of partition offsets; and reconstructing the first block using the selected partition mode.

2. The method of claim 1, wherein the reference template is generated using top and left lines of integer position samples of the reference block, and wherein the reconstruction template generated is using top and left lines of samples of the first block.

3. The method of claim 1, wherein each partition mode in the set of partition modes corresponds to a respective partition sign of a set of partition signs, wherein a first partition sign of the set of partition signs is signaled in the video bitstream, and wherein the set of partition angles are reordered based on the first partition sign.

4. The method of claim 1, further comprising reordering the set of partition offsets and selecting a partition offset from the reordered set of partition offsets.

5. The method of claim 1:

wherein the set of partition modes is grouped into a plurality of groups;

the method further comprises a group index of a selected group of the plurality of groups.

6. The method of claim 1, wherein the index value is coded using multi-symbol entropy coding.

7. The method of claim 1, wherein a maximum value for the index value is predefined or signaled in high-level syntax.

8. A method of video encoding performed at a computing system having memory and one or more processors, the method comprising:

receiving video data comprising a plurality of blocks, including a first block and a reference block associated with the first block, wherein the first block comprises at least two partitions and is to be predicted via a partition-based prediction;

obtaining a set of partition modes for partitioning the first block, each partition mode being uniquely associated with a partition line that partitions the first block into the at least two partitions, wherein each partition mode in the set of partition modes corresponds to a respective partition angle of a set of partition angles and a respective partition offset of a set of partition offsets;

generating both a reference template using samples of the reference block and a reconstruction template using samples of the first block, wherein the reference template is generated using integer samples of the reference block and blended using additional fractional samples of the reference block;

calculating, for each partition mode of the set of partition modes, a cost between the reference template and the reconstruction template;

reordering the set of partition angles corresponding to the set of partition modes based on the calculated cost between the reference template and the reconstruction template for each partition mode;

selecting a partition angle from the reordered set of partition angles;

signaling, via a video bitstream, an index value indicating the selected partition angle; and encoding the first block according to the selected partition angle and a partition offset of the set of partition offsets.

9. The method of claim 8, wherein the reference template is generated using top and left lines of integer position samples of the reference block, and wherein the reconstruction template generated is using top and left lines of samples of the first block.

10. The method of claim 8, wherein the reordered set of partition modes is a subset of the set of partition modes.

11. The method of claim 8, wherein each partition mode in the set of partition modes corresponds to a respective partition sign of a set of partition signs, wherein a first partition sign of the set of partition signs is signaled in the video bitstream, and wherein the set of partition angles are reordered based on the first partition sign.

12. The method of claim 8, further comprising reordering the set of partition offsets and selecting a partition offset from the reordered set of partition offsets.

13. The method of claim 8:

wherein the set of partition modes is grouped into a plurality of groups;

the method further comprises signaling a group index of a selected group of the plurality of groups.

14. The method of claim 8, further comprising encoding the index value using multi-symbol entropy coding.

15. The method of claim 8, further comprising signaling a maximum value for the index value in high-level syntax of the video bitstream.

16. A method for obtaining a video bitstream, the video bitstream comprising coded information for a plurality of blocks of video data, the plurality of blocks including a first block, and an indicator indicating an index value indicating a partition angle for the first block, the method comprising:

obtaining a set of partition modes for partitioning the first block, each partition mode being uniquely associated with a partition line that partitions the first block into at least two partitions, wherein each partition mode in the set of partition modes corresponds to a respective partition angle of a set of partition angles and a respective partition offset of a set of partition offsets;

generating both a reference template using samples of the reference block and a reconstruction template using samples of the first block, wherein the reference template is generated using integer samples of the reference block and blended using additional fractional samples of the reference block;

calculating, for each partition mode of the set of partition modes, a cost between the reference template and the reconstruction template;

reordering the set of partition angles corresponding to the set of partition modes based on the calculated cost between the reference template and the reconstruction template for each partition mode;

selecting a partition angle from the reordered set of partition angles;

signaling the index value indicating the selected partition angle; and encoding the first block according to the selected partition angle and a partition offset of the set of partition offsets.

17. The method of claim 16, wherein the reference template is generated using top and left lines of integer position samples of the reference block, and wherein the reconstruction template generated is using top and left lines of samples of the first block.

18. The method of claim 16, wherein the video bitstream further comprises a second indicator indicating a partition sign for the selected partition angle.

19. The method of claim 16, wherein the indicator indicating the index value is encoded using multi-symbol entropy coding.

20. The method of claim 16, wherein the video bitstream further comprises a second indicator indicating a maximum value for the index value.

\* \* \* \* \*